Jan. 30, 1940.   F. W. SEYBOLD   2,188,446
COMPOSING ROOM SAW
Original Filed May 21, 1936
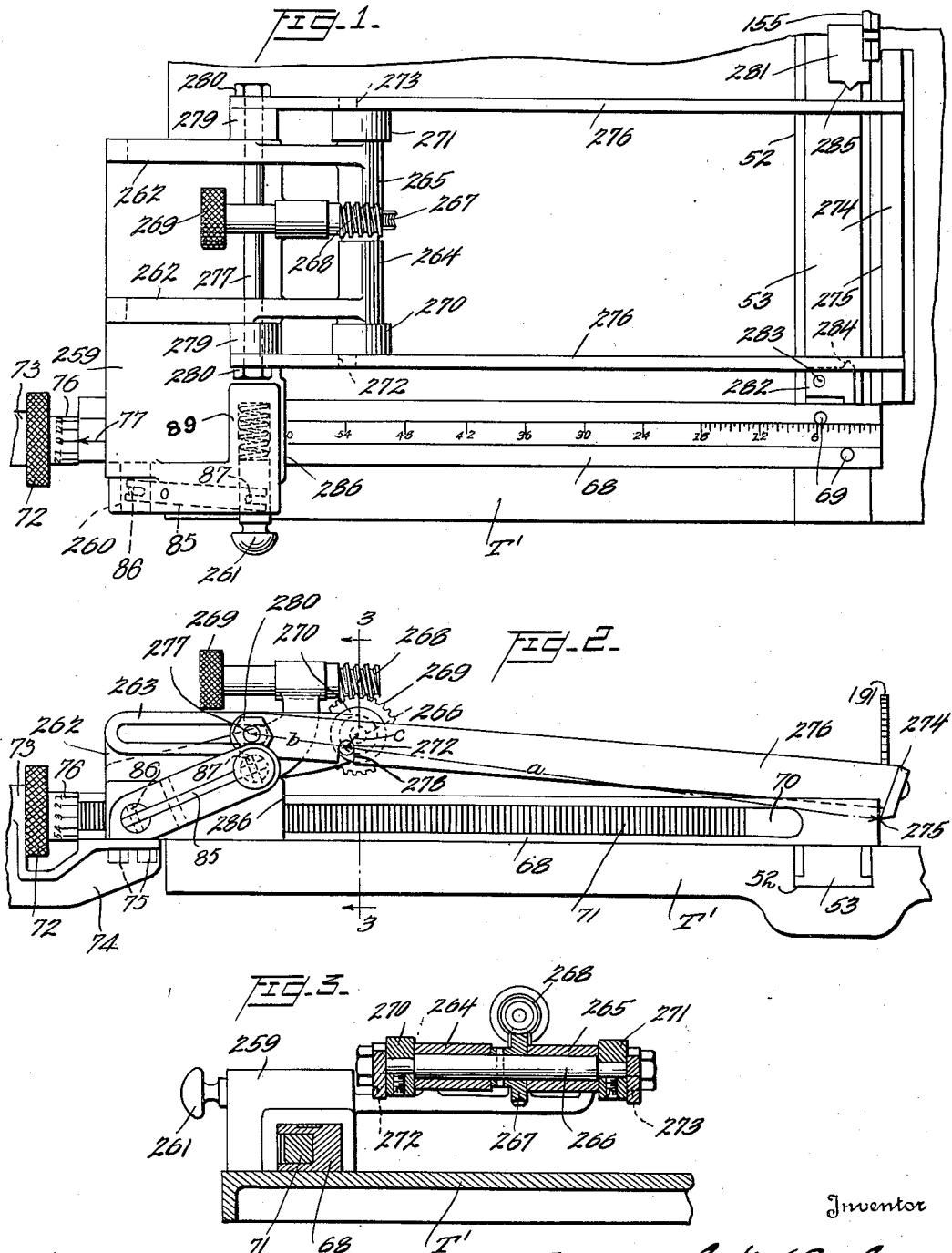
Inventor
Frederick W. Seybold,
By Watson, Coit, Morse
& Grindle, Attorney Patented Jan. 30, 1940

2,188,446

UNITED STATES PATENT OFFICE 2,188,446

COMPOSING ROOM SAW

Frederick W. Seybold, Westfield, N. J., assignor to American Type Founders Incorporated, Elizabeth, N. J., a corporation of New Jersey Original application May 21, 1936, Serial No. 81,069. Divided and this application March 12, 1937, Serial No. 130,607

10 Claims. (Cl. 29—69)

The present invention, which is a division of my application Serial No. 81,069, filed May 21, 1936, relates to metal saws and more particularly to composing room saws.

The principal object of the invention is to provide an improved device for lining up a cut that is out of square and trimming it with respect to a line of type or object in the cut, and accommodating and correctly aligning anything from a zinc etching or half-tone to type high cuts.

Other objects and features of novelty will be apparent from the description taken in connection with the drawing, in which:

Fig. 1 is a plan view of a portion of the table of a composing room saw with the line-up gauge of the present invention mounted thereon;

Fig. 2 is a front elevation of the parts shown in Fig. 1; and

Fig. 3 is a sectional elevation taken substantially on the line 3—3 of Fig. 2 and looking in the direction indicated by the arrows.

The line-up gauge attachment enables the operator to line up a cut that is out of square and trim it with respect to a line of type or object in the cut.

This device will accommodate and correctly align anything from a zinc etching or half-tone to type high cuts.

Referring to the drawing, it will be seen that the line-up gauge attachment is adapted to be associated with the pica gauge bar 68. It consists of a bracket 259 which fits over the pica gauge bar 68 and is provided with a rack pin 260 adapted to cooperate with the teeth of the gauge rack 71.

The pica gauge comprises a bar 68 rigidly secured, as by means of the pins 69, to the front end of the slide 53 in such manner that the bar rests on the top surface of the table and is slidable thereon together with the slide 53 fitting in groove 52 formed in the table T'. The bar 68 is formed with a recess 70 extending substantially throughout the length of the bar and open at its front side and the end opposite the slide 53. Slidably disposed within this recess is a gauge rack 71 having rack teeth facing the open side of the recess 70. These teeth have a pitch of a multiple of a "point," the unit of the printer's system of measurement. The left hand end of the gauge rack, as viewed in Fig. 2 is threaded and has a point gauge wheel 72 thereon disposed between the end of the gauge bar 68 and the collar 73 integral with the bracket 74 secured to the underside of the end portion of the gauge bar as by means of cap screws 75. The gauge wheel 72 is provided with graduations 76 cooperating with a fixed index 77 on the top of the gauge bar. The graduations indicate the subdivisions of one revolution of the wheel 72, it preferably being graduated into 12 divisions or points.

The bracket 259 is provided with means cooperating with the rack teeth to lock the bracket at any desired point along the gauge bar. As shown, a gauge rack pin 260 is slidably mounted in the bracket and has teeth at one end cooperating with the teeth of the rack 71. A gauge link 85 is pivoted intermediate its ends in a recess at the front side of the bracket and has one end slotted and engaging a pin 86 on the rack pin 260. The opposite end of the link is also slotted and engages a pin 87 on the slidable gauge knob 261. This knob is normally pressed outwardly by the spring 89 which pressure through the link tends to hold the rack pin 260 in engagement with the rack 71. To disengage the rack pin from the teeth of the rack the gauge knob 261 is pushed inwardly against the resistance of the spring 89.

The bracket 259 is provided with two spaced upstanding flanges 262 each formed with a slot 263 therein. These flanges at their forward ends have bearings 264 and 265 for a cross shaft 266. Intermediate the bearings 264 and 265 a worm wheel 267 is pinned to the shaft, the same adapted to be turned by a worm 268 rotated by means of the knurled head 269 on the shaft carrying the worm. At the outer sides of the bearings 264 and 265 the shaft 266 has discs 270 and 271 set screwed thereto. These discs on their outer faces carry crank pins 272 and 273.

The line-up blade 274, having the indicating edge 275, is carried by the two arms 276, the ends of which opposite the blade are pivotally mounted on a shaft 277 extending through the slots 263 of the flanges 262. The undersides of the arms 276 adjacent the shaft 277 are formed with a notch 278 receiving the crank pins 272 and 273. Interposed between the flanges 262 and the arms 276 are spacing sleeves 279 and the arms 276 are held on the shaft by end nuts 280.

The mounting of the line-up blade 274 is such that when adjusted vertically to and from the table T' by means of the knurled head 269, the indicating edge 275 travels in a plane perpendicular to the table. In other words, the mechanism for adjusting this indicating edge is a straight line motion. It is proportioned so that the dimensions c, a and b indicated on Fig. 2 bear the following relation:

$$c = \frac{b^2}{a}$$

Before trimming a cut, the blade 274 with arms 276 is swung about the shaft 277 through about 180° to carry the blade away from a position where it would be damaged by the saw or knives. The notches 278 permit the arms 276 to be lifted and the slots 263 permit the blade assembly to be moved toward the left as viewed in Fig. 2 as well as to be swung counterclockwise. The cut or work to be lined-up is clamped in adjusted position as indicated by the blade, between the clamp plate 155 and the pica bar 68. If necessary a short clamp plate 281 may be inserted to form an extension of the standard clamp plate 155. Further, an anvil 282 having a pin 283 adapted to be inserted in a hole in the slide may be provided, the same being formed with a bevelled blunt point 284 for engaging the work. The short clamp plate 281 may have a similar blunt engaging portion 285.

For the particular machine described herein, when the right side 286 of the bracket 259 is on the 60 pica graduation of the pica scale and the point gauge wheel is set at zero, the indicating edge of the line-up blade is in line with the path of the trimmer knives of the saw. As previously pointed out, the line-up blade may be raised or lowered to accommodate either type-high or unmounted plates, by turning the knurled head 269.

If a definite margin between a type line, or an object on the cut, and the trimming line is wanted, this margin in picas plus 60 picas (for the machine herein described) gives the setting of the right side 286 of the gauge bracket on the pica scale. Assume an eight pica margin is required between a type line on a cut and the trimmed edge, then set the line-up gauge so that the right side 286 of the bracket coincides with the 68 pica graduation, with the point gauge wheel at zero, line-up the type line on the cut with respect to the indicating edge 275 of the blade, clamp the cut, swing the line-up blade out of the way and move the work into contact with the saw blade 191. The entire line-up gauge may be moved by points from any given setting in either direction by manipulating the point gauge wheel.

Although one embodiment of the invention has been described in detail, it is to be understood that the invention is not thus limited, but includes modifications and changes that come within the scope of the appended claims.

Having thus described the invention, what is claimed as new and desired to be secured by Letters Patent is:

1. A machine of the character described including in combination, a saw, a table having a groove parallel to the cutting plane of the saw, a slide in said groove, a pica gauge bar rigidly secured to the front end of the slide at right angles thereto, a bracket slidable on said bar, means to lock said bracket to the bar in positions adjustable to multiples of a "point," a line-up blade having an indicating edge parallel to the cutting plane of the saw, means supporting the blade on the bracket for vertical adjustment of said edge in a plane perpendicular to the table said supporting means including a pivot parallel to said edge, and means to clamp work for movement with said slide.

2. A line-up gauge for cuts and the like including in combination, a bracket having a groove adapting the bracket to be placed on a pica gauge bar with the bar fitting the groove, a line-up blade having an indicating edge, and means supporting the blade on the bracket for adjustment of said edge in a vertical plane, said means including a pivot parallel to said edge.

3. A line-up gauge for cuts and the like including, in combination, a bracket having a groove adapting the bracket to be placed on a pica gauge bar with the bar fitting the groove, a line-up blade having an indicating edge, and means supporting the blade on the bracket for adjustment of said edge in a plane, said means including an arm carrying said blade at one end and slidingly pivoted at the other, the axis of the pivot being parallel to said edge, and a crank pin engaging said arm intermediate its ends.

4. The line-up gauge according to claim 3 wherein the relation of the parts is such that $$c = \frac{b^2}{a}$$

where b equals the distance from the axis of the pivot to the point where the crank pin engages said arm, a equals the distance from said point to said edge, and c equals the length of the crank.

5. A line-up gauge in accordance with claim 2 wherein said means includes a shaft mounted on the bracket for sidewise movement, a frame comprising two arms pivoted on said shaft and carrying said blade at their free ends, each arm having a notch in its underside intermediate said shaft and blade, crank discs having pins engaging in each notch, and means for rotatively adjusting said cranks.

6. A line-up gauge for cuts and the like including, in combination, a bracket having a groove adapting the bracket to be placed on a pica gauge bar with the bar fitting the groove, a line-up blade having an indicating edge, and means supporting the blade on the bracket for adjustment of said edge in a plane, said means including a shaft mounted on the bracket for sidewise movement, a frame comprising two arms pivoted on said shaft and carrying said blade at their free ends, each arm having a notch in its underside intermediate said shaft and blade, crank discs having pins engaging in each notch, and means for rotatively adjusting said cranks, the relation of the parts being such that $$c = \frac{b^2}{a}$$

where b equals the distance from the axis of the pivot to the point where the crank pin engages said arm, a equals the distance from said point to said edge, and c equals the length of the crank.

7. For use in connection with a composing room saw or similar cutting machine, a line-up gauge for cuts or the like including, in combination, a bracket adjustable along the pica gauge bar of said machine, a line-up blade having an indicating edge, means supporting said blade on said bracket for movement to a preliminary gauging position on top of the work and away from such position prior to the cutting operation, said supporting means also including means for adjusting said blade while in gauging position in a vertical plane to accommodate said blade to work of various heights.

8. For use in connection with a composing room saw or similar cutting machine, a line-up gauge for cuts or the like including, in combination, a bracket adjustable along the pica gauge bar of said machine, a line-up blade having an indicating edge, means movably and adjustably supporting said blade on said bracket, said means comprising an arm carrying said blade at its outer end and provided with a pivotal and slidable connection with said bracket at its inner end, a crank member carried by said bracket and having a readily detachable connection with said arm at an intermediate point thereon; the location of said point of connection and the length of said crank being predetermined and cooperating with said sliding connection whereby the edge of said gauge is given a vertical translatory movement when said crank is rotated to adapt itself to work of various heights; and said pivotal connection between the bracket and the arm, and the detachable connection between the arm and said crank arm enabling the gauge to be swung to a retracted position prior to the operation of the cutting machine.

9. For use in connection with a composing room saw or similar cutting machine, a line-up gauge for cuts or the like including, in combination, a bracket adjustable along the pica gauge bar of said machine, a line-up blade carried by said bracket, said line-up blade having an indicating edge adapted to be applied to a portion of the work, and means for adjusting said blade in a vertical plane.

10. For use in connection with a composing room saw or similar cutting machine, a line-up gauge for cuts or the like including, in combination, a bracket adjustable along the pica gauge bar of said machine, a line-up blade carried by said bracket and adapted to extend over the work, said line-up blade having an indicating edge parallel to the cutting plane of the saw and adapted to be applied to a portion of the work, and a straight line motion mechanism for adjusting said blade in a vertical plane, and means for clamping the work for movement with said pica gauge bar.

FREDERICK W. SEYBOLD.